United States Patent
Koch et al.

(10) Patent No.: US 12,092,502 B2
(45) Date of Patent: Sep. 17, 2024

(54) NON-INVASIVE THERMOMETER

(71) Applicant: Endress+Hauser Wetzer GmbH+Co. KG, Nesselwang (DE)

(72) Inventors: Daniel Koch, Oy-Mittelberg (DE); Marc Schalles, Erfurt (DE); Harald Bründl, Schwabhausen (DE); Stephan Wiedemann, Bihlerdorf (DE); Peter Wiedemann, Weitnau (DE); Torsten Iselt, Kempten (DE); Christian Peuker, Immenstadt (DE); Pavo Vrdoljak, Nesselwang (DE); Christian Kallweit, Memmingen (DE); Georg Wolf, Marktoberdorf (DE); Markus Mornhinweg, Dießen (DE); Alfred Umkehrer, Hopferau (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 270 days.

(21) Appl. No.: 17/755,277

(22) PCT Filed: Oct. 27, 2020

(86) PCT No.: PCT/EP2020/080145
§ 371 (c)(1),
(2) Date: Apr. 26, 2022

(87) PCT Pub. No.: WO2021/083871
PCT Pub. Date: May 6, 2021

(65) Prior Publication Data
US 2022/0397438 A1    Dec. 15, 2022

(30) Foreign Application Priority Data

Oct. 31, 2019  (DE) .................... 10 2019 129 475.4

(51) Int. Cl.
| | | |
|---|---|---|
| G01K 1/143 | (2021.01) | |
| G01F 1/688 | (2006.01) | |
| G01K 15/00 | (2006.01) | |

(52) U.S. Cl.
CPC ........... G01F 1/6888 (2013.01); G01K 1/143 (2013.01); G01K 15/005 (2013.01)

(58) Field of Classification Search
CPC ..... G01F 1/6888; G01K 1/143; G01K 15/005
See application file for complete search history.

(56) References Cited

U.S. PATENT DOCUMENTS

| | | |
|---|---|---|
| 5,382,093 A | 1/1995 | Dutcher |
| 2013/0070808 A1* | 3/2013 | Daily ...................... G01K 7/04 374/208 |

(Continued)

FOREIGN PATENT DOCUMENTS

| | | | |
|---|---|---|---|
| DE | 3126931 A1 | 2/1983 | |
| DE | 4427181 A1 * | 2/1996 | ............. G01K 1/143 |

(Continued)

*Primary Examiner* — Jamel E Williams
(74) *Attorney, Agent, or Firm* — Brannon Sowers & Cracraft PC

(57) ABSTRACT

An apparatus for determining and/or monitoring a process variable, for example, temperature, flow or flow velocity, of a medium in a containment includes a temperature sensor for registering temperature securable to an outer surface of the wall of the containment, at least one connection line for electrical contacting of the temperature sensor, and securement means for a releasable securing of the temperature sensor and a temperature sensor-near section of the connection line to the outer surface of the wall of the containment. According to the present disclosure, at least the section of the connection line is securable to the outer surface of the wall of the containment such that the section extends parallel with the wall of the and is in thermal contact with the wall of the containment.

14 Claims, 2 Drawing Sheets

(56) References Cited

U.S. PATENT DOCUMENTS

2014/0376594 A1  12/2014  Daily
2016/0047697 A1   2/2016  Decker

FOREIGN PATENT DOCUMENTS

| | | | |
|---|---|---|---|
| DE | 10029186 A1 | 1/2002 | |
| DE | 102005040699 B3 | 1/2007 | |
| DE | 102009007948 A1 * | 9/2010 | ............ F24D 19/10 |
| DE | 102012112575 A1 | 7/2014 | |
| DE | 102014118206 A1 | 6/2016 | |
| DE | 102014119593 A1 * | 6/2016 | ............... G01K 1/20 |
| DE | 102015112425 A1 * | 2/2017 | ........... G01K 15/005 |
| DE | 102015113237 A1 | 2/2017 | |
| DE | 102017100267 A1 * | 7/2018 | ............... G01K 1/16 |
| DE | 102017120941 A1 * | 3/2019 | ........... G01F 1/6847 |
| DE | 102018116309 A1 | 1/2020 | |
| EP | 2038625 B1 | 8/2011 | |
| EP | 2612122 A1 | 7/2013 | |
| EP | 2612122 B1 * | 10/2016 | ........... G01K 15/002 |
| EP | 3230704 B1 | 4/2019 | |
| EP | 18198608 A1 | 4/2020 | |
| JP | 2012088171 A * | 5/2012 | |
| JP | 2012088171 A1 | 5/2012 | |
| WO | WO-2021047881 A1 * | 3/2021 | ........... G01F 1/6847 |

* cited by examiner

NON-INVASIVE THERMOMETER

CROSS-REFERENCE TO RELATED APPLICATIONS

The present application is related to and claims the priority benefit of German Patent Application No. 10 2019 129 475.4, filed on Oct. 31, 2019, and International Patent Application No. PCT/EP2020/080145, filed Oct. 27, 2020, the entire contents of which are incorporated herein by reference.

TECHNICAL FIELD

The invention relates to an apparatus for determining and/or monitoring a process variable, especially the temperature, the flow, or the flow velocity, of a medium in a containment, for example, in automation technology. The containment is, for example, a container or a pipeline.

BACKGROUND

Thermometers are known in a wide variety of embodiments in the state of the art. Thus, there are thermometers that use the expansion of a liquid, a gas or a solid of known coefficient of expansion for measuring temperature, or such that relate the electrical conductivity of a material, or a variable derived therefrom, to the temperature, such as, for example, the electrical resistance in the case of application of resistance elements or the thermoelectric effect in the case of thermocouples. In contrast, in the case of radiation thermometers, especially pyrometers, the heat radiation of a substance is utilized for determining its temperature. The measuring principles of such measuring apparatuses have already been described in a great number of publications.

In the case of a temperature sensor in the form of a resistance element, known, among others, are so-called thin film and thick film sensors as well as also NTC thermistors. In the case of a thin film sensor, especially a resistance temperature detector (RTD), for example, a substrate-mounted sensor element equipped with connection wires is used, wherein the rear face of the substrate is, as a rule, coated with metal. Used as sensor elements are so-called resistance elements, for example, platinum elements, which are commercially available, for instance, under the designations, PT10, PT100, and PT1000.

In the case of temperature sensors in the form of thermocouples, in turn, the temperature is determined from a thermovoltage, which occurs between unilaterally connected, thermocouple wires of different materials. For temperature measurement, usually thermocouples according to DIN standard IEC584 are applied as temperature detector, e.g., thermocouples of type K, J, N, S, R, B, T or E. However, also other material pairs, especially such having a measurable Seebeck effect, are possible.

The accuracy of temperature measurement depends sensitively on the thermal contacts and the prevailing heat conduction. The heat flows between the medium, the containment, in which the medium is located, the thermometer and the process environment play, in such case, a deciding role. For a reliable temperature determination, it is important that the temperature sensor and the medium are, at least for a certain time required for registering the temperature, essentially in thermal equilibrium. The time for reaction of a thermometer to a temperature change is also referred to as the response time of the thermometer.

A high accuracy of measurement can especially be achieved when the temperature sensor is immersed in the medium. Thus, there are numerous thermometers, in the case of which the temperature sensor is more or less directly placed in contact with the medium. In this way, a comparatively good coupling between the medium and the temperature sensor can be achieved.

For various processes and for many containments, however, especially small containers or pipelines, a non-invasive determining of the temperature is advantageous. Thus, there are likewise thermometers, which can be secured externally/internally on the containment, in which the medium is located. Such apparatuses, also called surface thermometers or contact sensors, are known, for example, from documents such as DE102014118206A1 or DE102015113237A1. In the case of such measuring apparatuses, the temperature sensors are not in direct contact with the process. This requires that various additional aspects must be taken into consideration for assuring a good thermal coupling. Thus, for example, the mechanical, and therewith also the thermal, contact between container and thermometer is decisive for the achievable accuracy of measurement. In the case of insufficient contact, an exact temperature determination is not possible.

Used as surface-point or skin-point thermometers are frequently measuring inserts having temperature sensors in the form of thermocouples, which are welded directly to the outer surface or skin of the pipe or container. In such cases, the replacement of the thermocouples can, however, be a time-consuming and expensive process, especially because a replacement can require a temporary shutdown of the process and/or application. To overcome these disadvantages, known, for example, from U.S. Pat. No. 5,382,093 or European patent Application No. 18198608.4 (unpublished as of the earliest filing date of this application) are embodiments of thermometers, which enable a simple replacement of the temperature sensors.

Moreover, numerous, different embodiments of thermometers for non-invasive temperature measurement are described, for example, in the documents US2016/0047697A1, DE102005040699B3, EP3230704B1 and EP2038625B1.

A central problem in the case of non-invasive temperature determination is heat drain from the process to the environment. This causes a significantly greater measurement error than in the case of a direct introduction of the temperature sensor into the process.

The same problems result, for example, also for the case of a flow measuring device based on the thermal measuring principle for determining a flow or a flow velocity of a medium in a pipeline. Such field devices typically comprise at least two sensor elements having at least one temperature sensor and at least one heating element or heatable temperature sensor. The sensor elements can be both introduced into the pipeline, as well as also integrated in or on a measuring tube (non-invasive construction).

SUMMARY

Starting from the described problem of heat drain in the case of non-invasive temperature determination, an object of the invention is to provide an apparatus for temperature determination, especially for thermometers and for measuring apparatuses for determining a flow or a flow velocity, which apparatus is distinguished by a high accuracy of measurement.

The object is achieved by the apparatus for determining and/or monitoring a process variable, especially temperature, flow or flow velocity, of a medium in a containment according to the present disclosure. The apparatus of the invention includes a temperature sensor for registering temperature, which temperature sensor is securable to an outer surface of the wall of the containment, at least one connection line for electrical contacting of the temperature sensor, and a securement means for an, especially releasable, securing of the temperature sensor and a temperature sensor near section of the connection line to the outer surface of the wall of the containment. In such case, at least the section of the connection line is securable to the outer surface of the wall of the containment in such a manner that the section extends along the wall of the containment and is in thermal contact with the wall of the containment.

The temperature sensor as well as a section of the connection line are accordingly led along the wall of the containment, for example, a pipeline, and secured to the same. An orientation of the section along the wall of the containment means, on the one hand, an at least partial extension of the section of the connection line essentially in parallel with the wall, especially in parallel with a longitudinal axis of the wall. It is, however, likewise an option that the section is arranged, at least partially, wound around the wall, thus e.g., follows the circumference of the pipeline. Moreover, also numerous other types of extensions provide options, for example, a meandering of the connection line in the section. In each case, the at least one connection line in the section follows the contours of the wall of the containment.

The temperature of the medium is accordingly determined indirectly via a wall of the containment. By the selected orientation of the connection line relative to the wall of the containment, a contact area between the temperature sensor, the temperature sensor near section of the connection line and the pipeline is significantly enlarged. In this way, heat conduction of the medium via the wall of the containment to the temperature sensor and the temperature sensor near section of the connection line is significantly increased. Additionally, a temperature gradient in the temperature sensor near section of the connection line is significantly reduced. These effects, in turn, all lead to an improved accuracy of measurement.

The preventing of so-called heat drain errors are a basic problem in the field of industrial temperature determination, independently of whether the application is a thermometer or a flow measuring device. In the case of invasive thermometers, a popular topic of discussion in this connection is the so-called minimum immersion depth into the process, which usually should amount to at least 10 times the diameter of the thermometer. In the case of a lesser thermal contact, for example, because of the use of a protective tube, the minimum immersion depth should amount to even more than 10 times the thermometer diameter. In the case of block calibrators, the minimum immersion depth usually amounts to fifteen times the diameter of the reference thermometer used for calibration. In the case of a non-invasive temperature determination, in contrast, such as in the case of the invention, other measures must be used for assuring a homogeneous exposure of a sensor element to temperature. However, due to the very inhomogeneous heat input in the case of such a measurement, such is significantly more complex than in the case of an invasive temperature determination. The parallel orientation of the at least one connection line in a predeterminable section near the temperature sensor is an especially effective measure. It is, based on the invention, advantageously an option, analogously to the minimum immersion depth for invasive temperature determination, to define a minimum length for the section of the connection lines extending along the pipeline for minimizing heat drain errors.

The temperature sensor and the section of the at least one connection line can, on the one hand, be applied directly on the pipeline. It is, however, likewise an option that the temperature sensor and the connection line be part of a measuring insert, and the measuring insert is secured to the pipeline.

The apparatus can optionally further include an electronics. Alternatively, the electronics can also be a separate component, which is connectable with the apparatus. In case the temperature sensor is contacted by means of more than one connection line, preferably the temperature sensor near sections of all connection lines is oriented in parallel with the pipeline. The securement means can be any securement means usual and suitable for those skilled in the art, such as e.g., retainers or tube clamps, all of which fall within the scope of the invention.

An embodiment includes that the temperature sensor is a resistance element or a thermocouple.

The apparatus can also further comprise more than one temperature sensor. Moreover, the apparatus can also include at least one unit for heating and/or cooling. In the case of a plurality of elements—sensors, heating/cooling elements or additional components—these can be arranged, at least partially, in a shared measuring insert.

Another embodiment provides that the apparatus includes at least one reference element, which serves for in situ calibration and/or validation of at least the temperature sensor and which is secured to the outer surface of the wall of the containment. The reference element is composed at least partially of at least one material, which has in the temperature range relevant for calibrating the first temperature sensor at least one phase change at at least one predetermined phase change temperature, in the case of which phase change the material remains in the solid state. In this regard, comprehensive reference is taken to EP02612122B1 in the context of present patent application.

In an embodiment, the apparatus includes a heating element, which is secured to the outer surface of the wall of the containment. By means of the heating unit, the apparatus can, additionally, be heated to a predeterminable temperature. An embodiment with a heating element is especially advantageous when the apparatus is used for determining flow according to the thermal, flow measuring principle. The terminology, flow, according to the invention includes both a volume flow as well as also mass flow of the medium and can refer to either a volume or mass flow rate or to a total volume or mass flow found by integrating flow rate over time. Likewise, a flow velocity of the medium can be ascertained.

For example, the flow can be determined in two different ways. In a first measuring principle, a sensor element is heated in such a manner that its temperature remains essentially constant. In the case of known, and, at least at times, constant properties of the medium, such as the temperature of the medium, its density or composition, the mass flow of the medium through the pipeline can be ascertained based on the heating power needed for keeping the temperature at the constant value. The temperature of the medium is, in such case, that temperature, which the medium has without an additional heat input of a heating element. In the case of the second measuring principle, in contrast, the heating element is operated with constant heating power and the temperature of the medium downstream from the heating element measured. In such case, the measured temperature of the medium gives information concerning mass flow. Moreover, there are also other measuring principles, for example, so-called transient methods, in the case of which the heating power or the temperature is modulated.

The heating element can be embodied, for example, in the form of a resistance heater, which is heated via the conversion of electrical power supplied to it, e.g., as a result of an increased electrical current supply.

In another embodiment of the apparatus, the temperature sensor includes a temperature sensitive sensor element, which is electrically connected via at least first and second connection lines, wherein the first connection line is divided into first and second sections, wherein the first, sensor element near section is composed of a first material, and wherein the second, sensor element far section is composed of a second material differing from the first material, wherein the second connection line is composed of the second material, and wherein the first section of the first connection line and at least one part of the second connection line form a first difference temperature sensor in the form of a thermocouple. In this connection, comprehensive reference in the context of the present invention is made to the German patent application No. 102018116309.6 unpublished as of the earliest filing date of this application. With such an embodiment of the temperature sensor, a heat drain in the region of the temperature sensor is registrable. An exact knowledge of the heat drain further increases the accuracy of measurement of the apparatus. In the case of determining a flow, declining heat drain means higher flow rates of the medium in the containment can be detected, i.e., the measuring range of the apparatus can be expanded.

In an embodiment of the invention, the apparatus includes a heat conductive coupling unit, which can be placed on the outer surface of the containment. The coupling unit serves for an additional improving of the thermal contact between the temperature sensor, the section of the connection line and the medium through the outer surface of the wall of the containment.

The coupling unit is made, for example, of a heat conductive material, especially copper or silver.

In an additional embodiment, the coupling unit comprises, at least partially, a material with anisotropic thermal conductivity, preferably an, at least partially, carbon containing material, especially graphite, or hexagonal boron nitride. In this connection, comprehensive reference in the context of the present invention is taken to German patent application No. DE102017100267A1.

Advantageously, the coupling unit is arranged in such a manner that it surrounds at least the temperature sensor, a part of the section of the connection line and/or a part of the containment. The coupling unit is, in such case, preferably in thermal contact both with the containment as well as also with the temperature sensor and with the section of the connection line. It serves for additional heat conduction from the process to the temperature sensor and lessens a temperature gradient in the region of the temperature sensor and the section of the connection line.

The coupling unit serves therewith for the targeted distribution of heat from the process to process far regions of the temperature sensor and the section of the connection line. Moreover, it assures that all components of the apparatus are always in thermal equilibrium with one another.

It is, furthermore, advantageous that the coupling unit be embodied to assure that at least the temperature sensor and the section of the connection line are at all times essentially in thermal equilibrium with the wall of the containment.

Finally, it is advantageous when the coupling unit is an elongated element, which has in comparison with a surface area a small thickness, thus is, for example, an elongated, thin walled foil, or an elongated layer arrangement of at least two foils.

In another embodiment, the apparatus includes a housing, which is securable externally to the wall of the containment and is embodied in such a manner that in the state secured to the wall it surrounds at least the temperature sensor and the section of the connection line.

BRIEF DESCRIPTION OF THE DRAWINGS

The invention will now be explained in greater detail based on the appended drawing, the figures of which show as follows.

Figure 1:
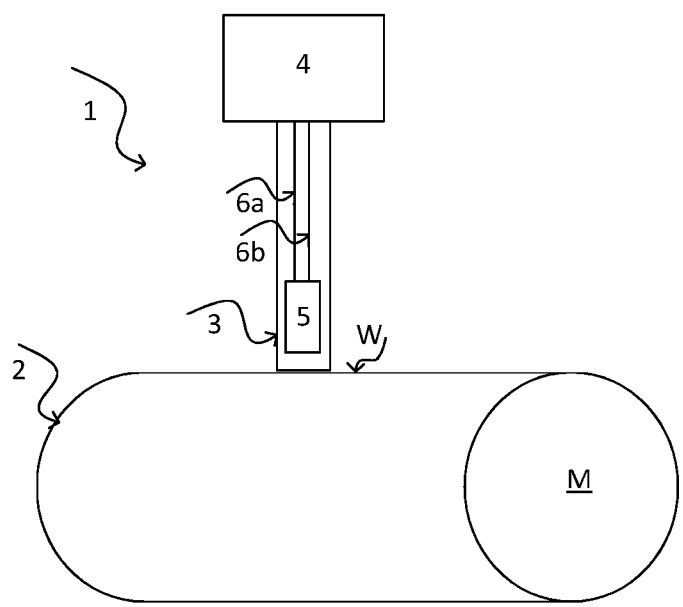
FIG. 1 shows a thermometer for non-invasive temperature measurement according to the state of the art.

In the figures, equal elements are provided with equal reference characters. The embodiments of the different figures are, furthermore, combinable with one another to the extent desired.

DETAILED DESCRIPTION

Without intending to limit the general applicability of the invention, the following description concerns thermometers. The various considerations can be directly transferred to other types of field devices, such as thermal, flow measuring devices.

Shown in FIG. 1 is a schematic view of a thermometer 1 according to the state of the art. Thermometer 1 includes a measuring insert 3 and an electronics 4. Thermometer 1 serves for registering the temperature T of a medium M, which is located in a containment 2, in such case, in the form of a pipeline. For such purpose, thermometer 1 does not protrude into the pipeline 2, but, instead, is superimposed externally on a wall W of the pipeline 2 for non-invasive temperature determination.

Measuring insert 3 includes a temperature sensor 5, which in the present case comprises a temperature sensitive element in the form of a resistance element. Temperature sensor 5 is electrically contacted and connected with the electronics 4 via the connection lines 6a, 6b.

While the shown thermometer 1 is embodied in compact construction with integrated electronics 4, in the case of other thermometers 1, the electronics 4 can also be arranged separately from the measuring insert 3. Also, temperature sensor 5 is not necessarily a resistance element and the number of connection lines 6 is not necessarily two. Rather, the number of connection lines 6 can be suitably selected, depending on applied measuring principle and applied temperature sensor 5.

As already shown, the accuracy of measurement such a thermometer 1 depends highly on the materials utilized for the thermometer and on the contacts, especially thermal contacts, especially in the region of the temperature sensor 5. Temperature sensor 5 is indirectly in thermal contact with the medium M, i.e., via the measuring insert 3 and via the wall W of the containment 2. A large role in this connection is also played by heat drain from the medium M to the environment, which can lead to an undesired temperature gradient in the region of the temperature sensor 5.

In order suitably to confront these problems according to the invention, alternative preferred embodiments for a non-invasive thermometer 1 are provided, such as shown by way of example in FIG. 2.

Figure 2A:
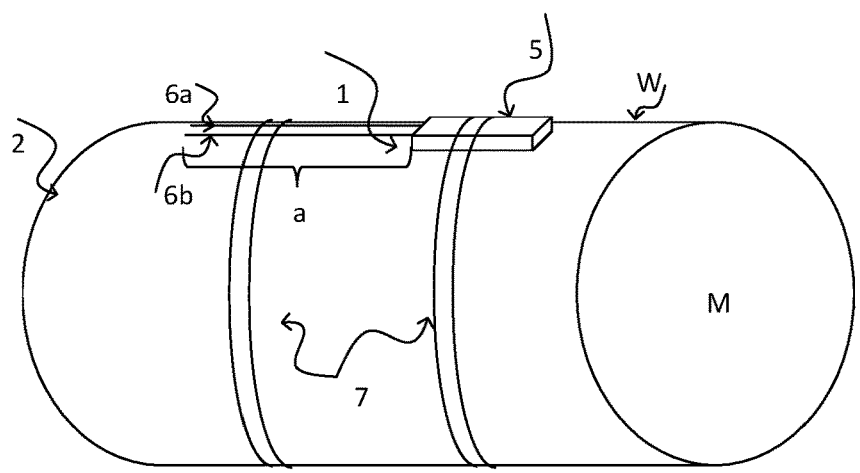
FIGS. 2a-2c show, by way of example, embodiments for a thermometer according to the present disclosure.

A first embodiment of a thermometer 1 of the invention is shown in FIG. 2a. Thermometer 1 includes a temperature sensor 5, which is electrically contacted via two connection lines 6a and 6b. Temperature sensor 5 is arranged on an outer surface of the wall W of the containment 2, and the connection lines 6a and 6b extend in the section a along the pipeline 2 and are oriented parallel with the pipeline 2. While the connection lines 6a, 6b for the shown embodiment extend in straight lines, in other embodiments they can be arranged, for example, also extending at least partially, or wound one or more times, around the containment 2. Also in such case, the course of the connection lines 6a,6b is fitted to the contour of the containment 2.

It is to be noted here that an apparatus 1 of the invention can also be applied in connection with containers and other types of containments 2. Also, the invention is not limited to embodiments with two connection lines 6a,6b. Rather, depending on type of temperature sensor 5 and depending on applied measuring principle, different numbers of connection lines 6a, 6b can be required.

Besides the temperature sensor 5, the apparatus 1 can include other components, such as, for example, a heating element 9, a reference element 10 and/or an additional temperature sensor 11. These components are, however, not shown in FIG. 2. Also, an electronics 4 is not shown in FIG. 2, solely for reasons of perspicuity.

Figure 2B:
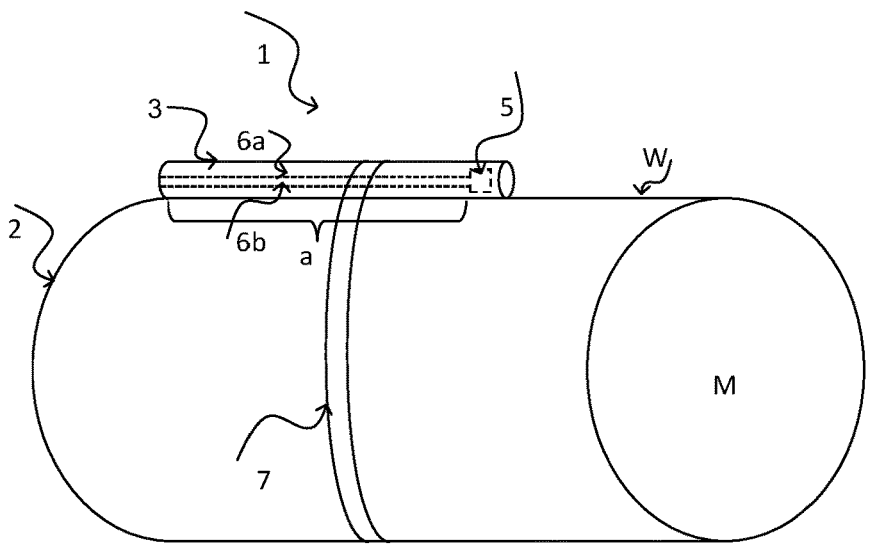

Temperature sensor 5 and at least the section of one of the connection lines 6a,6b can, however, also be part of a measuring insert 3, such as shown in FIG. 2b. There can in other embodiments, however, also be a plurality of temperature sensors 5, or supplementally applied heating elements, cooling elements, or reference elements, arranged in the same measuring insert.

In both cases, the apparatus 1 includes, furthermore, securement means 7 for securing the temperature sensor 5 and the temperature sensor near section of one of the connection lines 6a,6b to the wall W of the containment 2. This securement means 7 is embodied in the form of tube clamps for the shown embodiments. It is noted, however, that also all other suitable securement means 7 known in the state of the art can be used and likewise fall within the scope of the invention.

Figure 2C:
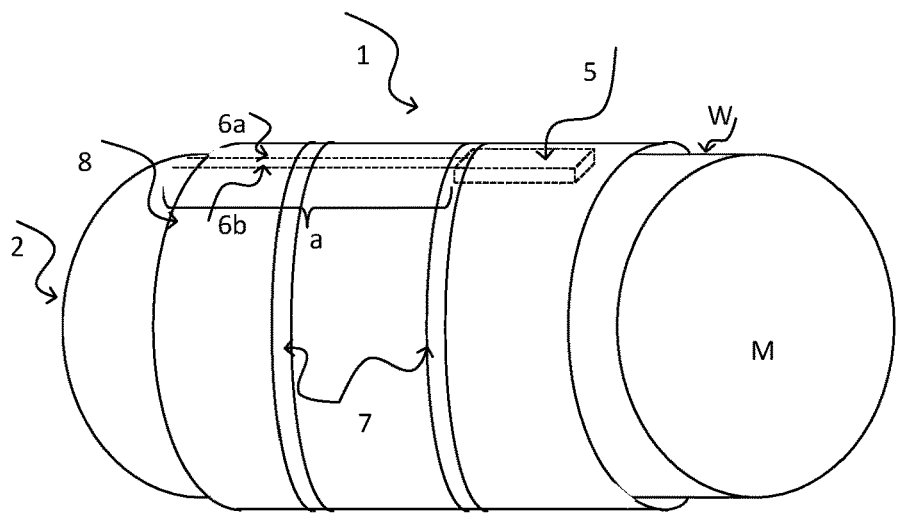

In the case of the embodiment shown in FIG. 2c, the apparatus includes 1, furthermore, a heat conductive coupling unit 8, which is here embodied, by way of example, in the form of a thin walled foil. Coupling unit 8 is arranged around the wall W of the containment 2 and secured by means of the securement means 7 against the wall W of the containment 2. In such case, the coupling unit 8 surrounds the temperature sensor 5 and the section of one of the connection lines 6a,6b.

Coupling unit 8 extends preferably at least along the region of the at least one temperature sensor 5 and the section of one of the connection lines 6a,6b. It serves to lessen, or to prevent, an undesired heat drain from the process, thus, from the medium M, into the environment. It especially lessens a temperature gradient in the region of the temperature sensor 5 and the section of one of the connection lines 6a,6b.

Other embodiments can, furthermore, include a housing 11 (not shown). Housing 11 is likewise securable externally to the wall W of the containment 2 and surrounds the temperature sensor 5, the section of one of the connection lines 6a,6b, and, in given cases, the coupling unit 8.

The invention claimed is:

1. An apparatus for determining and/or monitoring a process variable of a medium in a containment, the apparatus comprising:
   a temperature sensor configured to register a temperature, which temperature sensor is adapted to be securable to an outer surface of a wall of the containment;
   at least one connection line configured to electrically contact the temperature sensor;
   a securement device configured to secure both the temperature sensor and a near section of the at least one connection line at and near the temperature sensor and extending from the temperature sensor, to the outer surface of the wall of the containment; and
   a heat conductive coupling unit configured to be arranged on the outer surface of the wall of the containment, such that the heat conductive coupling unit surrounds and is positioned externally of each of the temperature sensor, the near section of the at least one connection line, and the containment,
   wherein at least the near section of the at least one connection line, the temperature sensor, and the heat conductive coupling unit are securable via the securement device to the outer surface of the wall, such that the near section extends along the wall and, together with the temperature sensor, is in thermal contact in a contact area with the outer surface of the wall of the containment, and the heat conductive coupling unit is positioned under the securement device and in thermal contact with the containment.

2. The apparatus of claim 1, wherein the temperature sensor is a resistance element or thermocouple.

3. The apparatus of claim 1, further comprising a reference element configured to enable in situ calibration and/or validation of at least the temperature sensor and to be securable to the outer surface of the wall of the containment, wherein the reference element comprises at least one material that has at least one phase change at at least one predetermined phase change temperature in a temperature range relevant for calibrating the temperature sensor, wherein the at least one material remains in the solid state at the at least one predetermined phase change temperature.

4. The apparatus of claim 1, further comprising a heating element configured to be securable to the outer surface of the wall of the containment.

5. The apparatus of claim 1, wherein the temperature sensor includes a temperature-sensitive sensor element, which is electrically contacted via a first connection line and a second connection line of the at least one connection line,
   wherein the first connection line is divided into first and second sections, wherein the first section, which is at or near the sensor element, comprises a first material, and wherein the second section, which is opposite the sensor element, comprises a second material, which differs from the first material,
   wherein the second connection line comprises the second material, and
   wherein the first section of the first connection line and at least one portion of the second connection line define a first difference temperature sensor in the form of a thermocouple.

6. The apparatus of claim 1, wherein the heat conductive coupling unit includes a foil.

7. The apparatus of claim 1, wherein the coupling unit comprises, at least partially, a material with anisotropic thermal conductivity.

8. The apparatus of claim 7, wherein the material with anisotropic thermal conductivity is, at least partially, graphite or hexagonal boron nitride.

9. The apparatus of claim 1, wherein the coupling unit is configured to ensure that at least the temperature sensor and the section of the at least one connection line are substantially in thermal equilibrium with the wall of the containment at all times.

10. The apparatus of claim 1, wherein the coupling unit is an elongated element having a small thickness relative to a surface area of the elongated element.

11. The apparatus of claim 10, wherein the coupling unit is an elongated, thin-walled foil or an elongated layer arrangement of at least two foils.

12. The apparatus of claim 1, further comprising a housing configured to be externally securable to the wall of the containment and configured as to surround at least the temperature sensor and the section of the at least one connection line when the housing is secured to the wall.

13. The apparatus of claim 1, wherein the securement device is configured to releasably secure the temperature sensor and the near section of the at least one connection line.

14. The apparatus of claim 1 wherein the securement device is configured to clamp the contact area of the temperature sensor and the near section against the outer surface of the wall of the containment.

\* \* \* \* \*